(12) United States Patent
Goodrich et al.

(10) Patent No.: US 8,666,569 B2
(45) Date of Patent: Mar. 4, 2014

(54) METHODS AND SYSTEMS FOR HEALTH MONITORING FOR AIRCRAFT

(75) Inventors: Jeff Goodrich, San Diego, CA (US); Paul Grabill, San Diego, CA (US); Tom Brotherton, Poway, CA (US); Rob Luppold, West Newton, PA (US)

(73) Assignee: Honeywell International Inc., Morristown, NJ (US)

( * ) Notice: Subject to any disclaimer, the term of this patent is extended or adjusted under 35 U.S.C. 154(b) by 987 days.

(21) Appl. No.: 12/615,974

(22) Filed: Nov. 10, 2009

(65) Prior Publication Data
US 2010/0057277 A1    Mar. 4, 2010

Related U.S. Application Data

(63) Continuation-in-part of application No. 12/526,431, filed as application No. PCT/US2008/054096 on Feb. 15, 2008.

(60) Provisional application No. 60/890,386, filed on Feb. 16, 2007.

(51) Int. Cl.
*G06F 7/00* (2006.01)
*G06F 17/30* (2006.01)
*G01C 21/00* (2006.01)

(52) U.S. Cl.
USPC ................. 701/14; 701/3; 707/802; 345/945; 345/971

(58) Field of Classification Search
USPC ......... 701/14, 3; 707/803, 802; 340/945, 971, 340/973
See application file for complete search history.

(56) References Cited

U.S. PATENT DOCUMENTS

| 4,943,919 | A  | * | 7/1990 | Aslin et al. | 701/3 |
|---|---|---|---|---|---|
| 6,173,159 | B1 | * | 1/2001 | Wright et al. | 455/66.1 |
| 6,246,320 | B1 | * | 6/2001 | Monroe | 340/506 |
| 6,341,248 | B1 | * | 1/2002 | Johnson | 701/4 |
| 6,408,259 | B1 |   | 6/2002 | Goebel et al. | |
| 6,556,902 | B2 | * | 4/2003 | Ing et al. | 701/33.7 |
| 6,574,537 | B2 |   | 6/2003 | Kipersztok et al. | |
| 6,651,012 | B1 | * | 11/2003 | Bechhoefer | 702/34 |
| 6,711,523 | B2 |   | 3/2004 | Bechhoefer et al. | |
| 6,871,160 | B2 |   | 3/2005 | Jaw | |
| 6,928,345 | B2 | * | 8/2005 | Quinn | 701/32.1 |
| 7,203,630 | B2 | * | 4/2007 | Kolb et al. | 703/6 |

(Continued)

FOREIGN PATENT DOCUMENTS

EP    0407179 A1    1/1991
WO    0007126 A1    2/2000

OTHER PUBLICATIONS

Levine, S.; The Remote Aircraft Flight Recorder and Advisory Telemetry System—Raft(Patent Pending) and It's Application to Unifying the Total Digital Avionics System, 0-7803-5086-3/98, 1998 IEEE.
EP Search Report, EP 08729982.2-1807 dated Feb. 22, 2013.

*Primary Examiner* — Tuan C. To
(74) *Attorney, Agent, or Firm* — Ingrassia Fisher & Lorenz, P.C.

(57) ABSTRACT

A method for health monitoring for an aircraft includes the steps of obtaining vibration data for the aircraft, obtaining navigation data for the aircraft, and determining a measure of health of the aircraft using the vibration data and the navigation data.

16 Claims, 3 Drawing Sheets

(56) References Cited

U.S. PATENT DOCUMENTS

| | | |
|---|---|---|
| RE39,618 E | 5/2007 | Levine |
| 7,324,923 B2 | 1/2008 | DellaVilla, Jr. et al. |
| 7,379,800 B2 | 5/2008 | Breed |
| 7,489,992 B2 | 2/2009 | Valette et al. |
| 7,573,396 B2* | 8/2009 | Stokes ................. 340/693.2 |
| 7,714,702 B2* | 5/2010 | Khuzadi .................. 340/425.5 |
| 7,719,416 B2* | 5/2010 | Arms et al. ............... 340/539.1 |
| 2002/0016654 A1* | 2/2002 | Ing et al. ..................... 701/29 |
| 2004/0176885 A1* | 9/2004 | Quinn ........................... 701/29 |
| 2004/0176887 A1* | 9/2004 | Kent et al. ..................... 701/30 |
| 2004/0176902 A1 | 9/2004 | McBrien et al. |
| 2004/0260777 A1 | 12/2004 | Kolb et al. |
| 2005/0096873 A1* | 5/2005 | Klein ........................... 702/184 |
| 2005/0104771 A1 | 5/2005 | Terry et al. |
| 2005/0114090 A1 | 5/2005 | Black et al. |
| 2005/0275563 A1* | 12/2005 | Ziarno ......................... 340/945 |
| 2008/0154445 A1* | 6/2008 | Goodman et al. ............... 701/3 |
| 2008/0177439 A1 | 7/2008 | Betters et al. |

* cited by examiner

_US 8,666,569 B2_

METHODS AND SYSTEMS FOR HEALTH MONITORING FOR AIRCRAFT

PRIORITY CLAIMS AND CROSS REFERENCE TO RELATED APPLICATIONS

This is a continuation in-part of U.S. application Ser. No. 12/526,431, filed Aug. 7, 2009, which was the National Stage of International Application No. PCT/US08/54096, filed Feb. 16, 2007, which claimed priority to U.S. Patent Application 60/890,386 filed Feb. 16, 2007, each of which are incorporated by reference herein in their entireties.

TECHNICAL FIELD

The present invention generally relates to the field of aircraft and, more specifically, to methods and systems for health monitoring for aircraft.

BACKGROUND OF THE INVENTION

Aircraft often have a health monitoring system to assist in determining faults in the aircraft. A health monitoring system may collect various aircraft data for any irregularities or other signs of a fault or problem with the aircraft. While health monitoring systems for aircraft generally perform well in detecting certain faults, it may be desired to further improve health monitoring systems and methods for health monitoring for aircraft, for example that prove improved interpretations and use of health monitoring information.

Accordingly, it is desirable to provide improved methods for health monitoring for aircraft, for example that that provide improved interpretations and use of health monitoring information. It is further desirable to provide improved systems for health monitoring for aircraft, for example that that provide improved interpretations and use of health monitoring information. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment, a method for health monitoring for an aircraft is provided. The method comprises the steps of obtaining vibration data for the aircraft, obtaining navigation data for the aircraft, and determining a measure of health of the aircraft using the vibration data and the navigation data.

In accordance with another exemplary embodiment, a method for initiating health monitoring for an aircraft by a ground station is provided. The method comprises the steps of receiving user input, the user input including information regarding a plurality of details as to a make-up of the aircraft, downloading the information to a database on the ground station, and configuring the ground station using the information.

In accordance with a further exemplary embodiment, a system for health monitoring for an aircraft is provided. The system comprises a health monitoring system, a navigation system, and a processor. The health monitoring system is configured to at least facilitate measuring vibration data for the aircraft during flight of the aircraft. The navigation system is configured to at least facilitate measuring navigation data for the aircraft during flight of the aircraft. The processor is coupled to the health monitoring system and the navigation system. The processor is configured to at least facilitate fusing the vibration data and the navigation data, thereby generating fused data and determining a measure of health of the aircraft using the fused data.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The above-referenced International Application No. PCT/US08/54096, filed Feb. 16, 2007, was published in English under PCT Article 21(2).

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
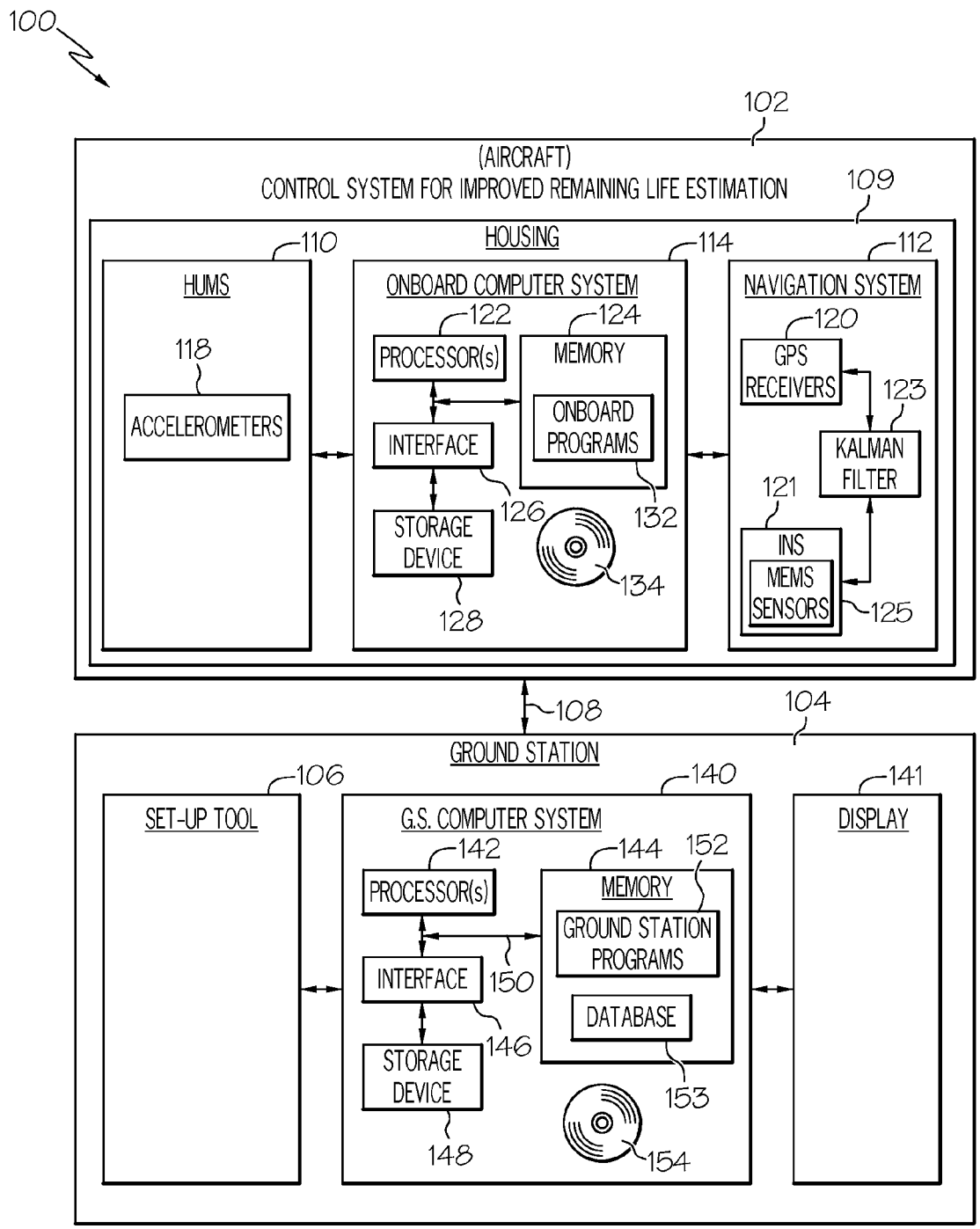
FIG. 1 is a functional block diagram of a system for health monitoring for an aircraft, in accordance with an exemplary embodiment.

FIG. 1 is a functional block diagram of a system 100 for health monitoring for an aircraft, in accordance with an exemplary embodiment of the present invention. It will be appreciated that, in various embodiments, the aircraft may comprise any one of a number of different types of airplanes, helicopters, spacecraft, and/or other types of aircraft.

In the depicted embodiment, the system 100 comprises a control system 102, a ground system 104, and one or more communications links 108. The control system 102 preferably at least facilitates calculations and determinations for improved remaining life estimation for the aircraft. In addition, in a preferred embodiment, the control system 102 is disposed onboard the aircraft. The control system 102 is preferably coupled to the ground station 104.

As depicted in FIG. 1, the control system 102 preferably includes a housing 109, a health and usage monitoring (HUMS) system 110, a navigation system 112, and an onboard computer system 114. The HUMS system 110, the navigation system 112, and the onboard computer system 114 are each preferably disposed within the housing 109 onboard the aircraft, and are preferably coupled together via one or more buses, as shown in FIG. 1.

The HUMS system 110 is configured to at least facilitate measuring vibration data for the aircraft during flight of the aircraft, generating a vibration signature of the aircraft using the vibration data, and providing the vibration data and/or the vibration signature to the onboard computer system 114. In certain embodiments, the vibration data and/or the vibration signature may be provided to the ground station 104 for processing instead of or in addition to the onboard computer system 114 for processing. In a preferred embodiment, the HUMS system 110 conducts these functions in accordance with the steps of the health monitoring process 200 and the health monitoring initiation process 300 depicted in FIGS. 2 and 3, respectively, and described further below in connection therewith. Also in a preferred embodiment, the HUMS system 110 comprises a plurality of accelerometers. In addition, in a preferred embodiment, the HUMS system 110 is configured to at least facilitate collection of all aircraft bus data.

In a preferred embodiment, the navigation system 112 is configured to at least facilitate measuring navigation data for the aircraft during flight of the aircraft, generating a plurality of flight regime characteristics of the aircraft using the navigation data, and providing the navigation data and/or the flight regime characteristics to the onboard computer system 114 for processing. In certain embodiments, the navigation data and/or the flight regime characteristics may be provided to the ground station 104 for processing instead of or in addition to the onboard computer system 114. In a preferred embodiment, the navigation system 112 conducts these functions in accordance with the steps of the health monitoring process 200 and the health monitoring initiation process 300 depicted in FIGS. 2 and 3, respectively, and described further below in connection therewith.

In the depicted embodiment, the navigation system 112 includes a global position system (GPS) receiver 120, an inertial navigation system (INS) 122, and a Kalman filter 123. The GPS receiver 120 obtains information as to flight paths and geographic locations of the aircraft during flight. The inertial navigation system 121 measures various movements of the aircraft. In a preferred embodiment, the inertial navigation system 121 measures various magnitudes and directions of movement of the aircraft during flight. As depicted in FIG. 1, the inertial navigation system 121 preferably includes a plurality of inertial navigation sensors, most preferably micro electromechanical system (MEMS) sensors 125 as depicted in FIG. 1.

The GPS receiver 120 and the inertial navigation system 121 are preferably each coupled to the Kalman filter 123. In a preferred embodiment, the Kalman filter 123 couples the GPS receiver 120 and the inertial navigation system 121 together. Also in a preferred embodiment, the GPS receiver 120, the inertial navigation system 121, and the Kalman filter are each coupled to the onboard computer system 114, preferably to a one or more processors 122 thereof.

The onboard computer system 114 is coupled to the HUMS system 110, the navigation system 112, and the ground station 104. The onboard computer system 114 is configured to fuse the vibration data and the navigation data (preferably by fusing the vibration signature and the flight regime characteristics of the aircraft) in determining measures of health of the aircraft (preferably including calculating estimated measures of life for aircraft components and/or providing recommendations for condition-based maintenance). In certain embodiments, the onboard computer system 114 also fuses various other data, such as tachometer data, aircraft bus data, engine bus data, analog data, and other bus data, with the vibration data and the navigation data, as described in greater detail further below in connection with the health monitoring process 200 of FIG. 2.

In addition, in a preferred embodiment, the onboard computer system 114 provides some or all of this data and information (and/or intermediate calculations pertaining thereto) to the ground station 104 for assistance with some or all of these calculations, determinations, estimates, and/or recommendations. In a preferred embodiment, the onboard computer system 114 conducts these functions in accordance with the steps of the health monitoring process 200 and the health monitoring initiation process 300 depicted in FIGS. 2 and 3, respectively, and described further below in connection therewith.

In the depicted embodiment, the onboard computer system 114 includes one or more processors 122, a memory 124, an interface 126, a storage device 128, and an onboard computer bus 130. The one or more processors 122 performs the computation and control functions of the onboard computer system 114, and may comprise any type of processor or multiple processors, single integrated circuits such as a microprocessor, or any suitable number of integrated circuit devices and/or circuit boards working in cooperation to accomplish the functions of a processing unit. During operation, the one or more processors 122 execute one or more onboard programs 132 (preferably an onboard health maintenance program 132) contained within the memory 124 and, as such, control the general operation of the onboard computer system 114. In a preferred embodiment, the one or more processors 122 conduct these functions in accordance with the steps of the health monitoring process 200 and the health monitoring initiation process 300 depicted in FIGS. 2 and 3, respectively, and described further below in connection therewith. In one preferred embodiment, the onboard computer system 114 includes four processors 122.

The memory 124 can be any type of suitable memory. This would include the various types of dynamic random access memory (DRAM) such as SDRAM, the various types of static RAM (SRAM), and the various types of non-volatile memory (PROM, EPROM, and flash). The onboard computer bus 130 serves to transmit programs, data, status and other information or signals between the various components of the onboard computer system 114. In a preferred embodiment, the memory 124 stores the above-referenced onboard program 132 (preferably an onboard health maintenance program 132, as referenced above), in accordance with the steps of the health monitoring process 200 and the health monitoring initiation process 300 depicted in FIGS. 2 and 3, respectively, and described further below in connection therewith.

The interface 126 allows communication to the onboard computer system 114, for example from a system driver and/or another computer system, and can be implemented using any suitable method and apparatus. It can include one or more network interfaces to communicate with other systems or components. The interface 126 may also include one or more network interfaces to communicate with technicians, and/or one or more storage interfaces to connect to storage apparatuses, such as the storage device 128.

The storage device 128 can be any suitable type of storage apparatus, including direct access storage devices such as hard disk drives, flash systems, floppy disk drives and optical disk drives, such as one or more disks 134 and/or drives therefore. In one exemplary embodiment, the storage device 128 comprises a program product from which memory 124 can receive an onboard program 132 that executes one or more embodiments of one or more processes of the present invention, such as the health monitoring process 200 and the health monitoring initiation process 300 depicted in FIGS. 2 and 3, respectively, and described further below in connection therewith. In another exemplary embodiment, the program product may be directly stored in and/or otherwise accessed by the memory 124 and/or a disk such as that referenced below.

The onboard computer bus 130 can be any suitable physical or logical means of connecting computer systems and components. This includes, but is not limited to, direct hardwired connections, fiber optics, infrared and wireless bus technologies. During operation, the onboard program 132 is stored in the memory 124 and executed by the one or more processors 122.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the onboard computer system 114 may also otherwise differ from the embodiment depicted in FIG. 1, for example in that the onboard computer system 114 may be coupled to or may otherwise utilize one or more remote computer systems and/or other control systems.

The ground station 104 is coupled to the control system 102. The ground station 104 is preferably configured to at least facilitate calculations and determinations for improved remaining life estimation for the aircraft. In the depicted embodiment, the ground station 104 includes a ground station computer system 140, a display 141, and a set-up tool 106.

The ground station computer system 140 is coupled to the onboard computer system 114, preferably to the processor 122 thereof. In a preferred embodiment, the ground station computer system 140 is configured to assist with some or all of the fusion of the vibration data and the navigation data (such as by fusing some or all of the vibration signature and the flight regime characteristics of the aircraft), and in certain embodiments fusing other data as well (such as tachometer data, aircraft bus data, engine bus data, analog data, and other bus data) in helping to determine measures of health of the aircraft (preferably including calculating estimated measures of life for aircraft components and/or providing recommendations for condition-based maintenance).

Specifically, in a preferred embodiment, the ground station computer system 140 is configured to obtain raw, immediate, or partially processed vibration data and navigation data from the onboard computer system 114 (and, in certain embodiments, other data, such as the other types of data referenced above) and to further process the this information in helping to make some or all of the above-referenced calculations, determinations, estimates, and/or predictions. Also in a preferred embodiment, the ground station computer system 140 conducts these functions in accordance with the steps of the health monitoring process 200 and the health monitoring initiation process 300 depicted in FIGS. 2 and 3, respectively, and described further below in connection therewith.

Similar to the onboard computer system 114, in the depicted embodiment the ground station computer system 140 includes at least one processor 142, a memory 144, an interface 146, a storage device 148, and a ground station computer bus 150. The processor 142 performs the computation and control functions of the ground station computer system 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more ground station programs 152 contained within the memory 144 and, as such, controls the general operation of the ground station computer system 140. In a preferred embodiment, the processor 142 conducts these functions in accordance with the steps of the health monitoring process 200 and the health monitoring initiation process 300 depicted in FIGS. 2 and 3, respectively, and described further below in connection therewith.

The memory 144 can be any type of suitable memory. This would include the various types of dynamic random access memory (DRAM) such as SDRAM, the various types of static RAM (SRAM), and the various types of non-volatile memory (PROM, EPROM, and flash). The ground station computer bus 150 serves to transmit programs, data, status and other information or signals between the various components of the ground station computer system 140. In a preferred embodiment, the memory 144 stores the above-referenced ground station program 152 along with the set-up tool 106 and one or more databases 153 that are populated with aircraft-specific information in configuring the ground station 104 by the set-up tool 106 (as discussed further below) in accordance with the steps of the health monitoring process 200 and the health monitoring initiation process 300 depicted in FIGS. 2 and 3, respectively, and described further below in connection therewith.

The interface 146 allows communication to the ground station computer system 140, for example from a system driver and/or another computer system, and can be implemented using any suitable method and apparatus. It can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including direct access storage devices such as hard disk drives, flash systems, floppy disk drives and optical disk drives, such as one or more disks 154 and/or drives therefore. In one exemplary embodiment, the storage device 148 comprises a program product from which memory 144 can receive a ground station program 152 that executes one or more embodiments of one or more processes of the present invention, such as the health monitoring process 200 and the health monitoring initiation process 300 depicted in FIGS. 2 and 3, respectively, and described further below in connection therewith. In another exemplary embodiment, the program product may be directly stored in and/or otherwise accessed by the memory 144 and/or a disk such as that referenced below.

The ground station computer bus 150 can be any suitable physical or logical means of connecting computer systems and components. This includes, but is not limited to, direct hard-wired connections, fiber optics, infrared and wireless bus technologies. During operation, the ground station program 152 is stored in the memory 144 and executed by the processor 142.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the ground station computer system 140 may also otherwise differ from the embodiment depicted in FIG. 1, for example in that the ground station computer system 140 may be coupled to or may otherwise utilize one or more remote computer systems and/or other control systems.

The display 141 is coupled to the ground station computer system 140. In a preferred embodiment, the display 141 displays one or more results of the processing of the ground station computer system 140 and/or the onboard computer system 114, such as results of the fusion of the health monitoring data and the navigation data, measures of the health of the aircraft, estimates of the projected life of various components of the aircraft, and/or recommendations for condition-based maintenance, among other possible displayed results, data, and/or information. The display 141 may include, by way of example only, an audio and/or visual display.

The set-up tool 106 is coupled to the control system 102 and the ground station computer system 140, and is most preferably coupled to the respective processors 122 and 142 thereof. The set-up tool 106 is preferably configured to at least facilitate receiving user input with aircraft-specific information pertaining to the aircraft, downloading the aircraft-specific information to the database 153 of the ground station 104, configuring the ground station 104 for the particular type of aircraft, creating a load module for the onboard computer system 114, and configuring inputs and outputs for the onboard computer system 114. Also in a preferred embodiment, the set-up tool 106 conducts these functions in accordance with the steps of the health monitoring process 200 and the health monitoring initiation process 300 depicted in FIGS. 2 and 3, respectively, and described further below in connection therewith.

In a preferred embodiment, the set-up tool 106 is a software module stored in the ground station 104 and executed by the ground station computer system 140, specifically, by the processor 142 thereof. However, this may vary in other embodiments. Also in one preferred embodiment, the set-up tool 106 is stored within the memory 144 of the ground station computer system 140. However, this may also vary in other embodiments.

The one or more communications links 108 link or couple the control system 102 and the ground station 104 (including the computer systems 114*m* 149 and processors 122, 142 thereof, and the set-up tool 106). In certain embodiments, the one or more communications links 108 comprise one or more wireless communications buses. However, it will be appreciated that any number of different types of communications links 108 may be utilized in various exemplary embodiments of the present invention.

Figure 2:
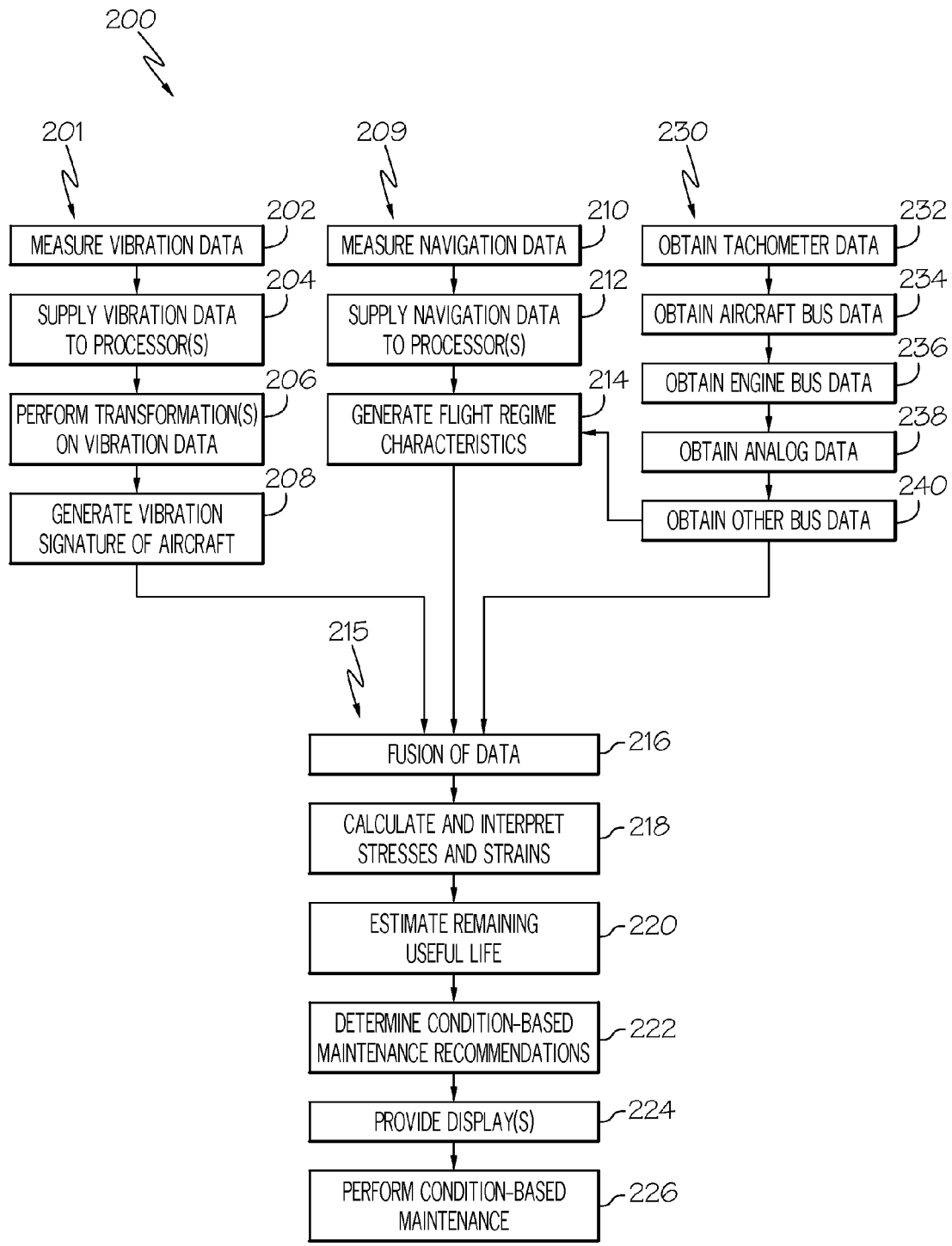
FIG. 2 is a flowchart of a process for health monitoring for an aircraft, and that can be used in connection with the system of FIG. 1, and that includes a vibration data sub-process, a navigation data sub-process, an additional data sub-process, and a fusion sub-process, in accordance with an exemplary embodiment.

FIG. 2 is a flowchart of a health monitoring process 200 for health monitoring for an aircraft, in accordance with an exemplary embodiment. The health monitoring process 200 can be utilized in conjunction with the system 100 of FIG. 1, also in accordance with an exemplary embodiment. In one preferred embodiment, the health monitoring process 200 can be used to determine a measure of the aircraft and of various aircraft components using all available information.

As depicted in FIG. 2, the health monitoring process 200 includes a vibration data sub-process 201. The vibration data sub-process 201 begins with the step of measuring vibration data of the aircraft (step 202). In a preferred embodiment, the vibration data is measured by the accelerometers 118 of the HUMS system 110 of FIG. for various components of the aircraft during flight. The vibration data is preferably then supplied to one or more processors (step 204), and one or more transformations are performed on the vibration data (step 206). In a preferred embodiment, signal processing is performed on the vibration data by the one or more processors 122 of the onboard computer system 114 and/or the processor 142 of the ground station computer system 140. The processors then generate a vibration signature for the aircraft using the transformed vibration data (step 208).

In addition, also as depicted in FIG. 2, the health monitoring processor 200 also includes a navigation data sub-process 209. In a preferred embodiment, the navigation data sub-process 209 is conducted simultaneously with the vibration data sub-process 201. However, this may vary in other embodiments.

In the depicted embodiment, the navigation data sub-process 209 begins with the step of measuring navigation data for the aircraft (step 210). In a preferred embodiment, the navigation data is measured by the GPS receiver 120, the inertial navigation system sensor 122 (preferably including the MEMS sensors 125 thereof), and the Kalman Filter 123 of the navigation system 112 of FIG. 1. The navigation data preferably comprises information as to how the aircraft has been operated, under what conditions the aircraft has been operated, the geographic locations and environments in which the aircraft has been operated, and information regarding the types of moments and forces that the aircraft has been subjected to.

The navigation data is preferably then supplied to one or more processors (step 212). The processors then generate a plurality of flight regime characteristics using the navigation data (step 214).

In addition, in various embodiments, various additional types of data and information are also obtained via an additional data sub-process 230. In a preferred embodiment, the additional data sub-process 230 is conducted simultaneously with the vibration data sub-process 201 and the navigation data sub-process 209. However, this may vary in other embodiments.

In the depicted embodiment, the additional data sub-process 230 includes the steps of obtaining tachometer data (step 232), obtaining aircraft bus data (such as aircraft attitude, movement, and performance information, among other possible aircraft bus data) (step 234), obtaining engine bus data (such as engine performance and control information, among other possible engine bus data) (step 236), obtaining analog data (such as temperature, pressure, humidity, and other environmental information, among other possible analog data) (step 238), and obtaining other bus data (step 240).

In a preferred embodiment, such additional data is obtained during steps 232-240 by the onboard computer system 114 and the ground station computer system 140 via the one or more communications links 108 and/or one or more other links and/or buses of or between the control system 102 and/or the ground station 104. In addition, in certain embodiments, the additional data of steps 232-240 is also used in generating the above-described flight regime characteristics of step 214.

The process then proceeds with a fusion sub-process 215. In the depicted embodiment, the fusion sub-process 215 begins with the fusion of the various types of data together (step 216). In a preferred embodiment, at least the vibration data of the vibration data sub-process 201 and the navigation data of the navigation data sub-process 209 are fused together. In a most preferred embodiment, the vibration data of the vibration data sub-process 201, the navigation data of the navigation data sub-process 209, and the additional data of the additional data sub-process 230 are each fused together.

Also in a preferred embodiment, the vibration signature and the flight regime characteristics are fused together by the one or more processors 122 of the onboard computer system 114 and/or the processor 142 of the ground station computer system 140. In so doing, the navigation data and flight regime characteristics preferably help to provide appropriate and detailed context to the vibration data and the vibration signature of the aircraft. In addition, in a most preferred embodiment, the vibration signature, the flight regime characteristics, the vibration data, the navigation data, and the additional data are each fused together, so that calculations, evaluations, and interpretations can be made effectively and efficiently using all available data and information.

Stresses and strains are then identified and evaluated (step 218) using the fused data, preferably also by the one or more processors 122 of the onboard computer system 114 and/or the processor 142 of the ground station computer system 140. The fused data from step 216 and/or the interpreted data from step 218 are then utilized to estimate remaining useful life of the various components of the aircraft (step 220). These estimates are also preferably conducted by the one or more processors 122 of the onboard computer system 114 and/or the processor 142 of the ground station computer system 140. In addition, in one preferred embodiment, the calculations, interpretations, and estimations of steps 220 are performed using the fused data as well as independent data form the vibration data, the navigation data, and the additional data.

In addition, recommendations for condition-based maintenance are made for condition-based maintenance (step 222). In a preferred embodiment, these recommendations are made by the one or more processors 122 of the onboard computer system 114 and/or the processor 142 of the ground station computer system 140 using the estimations of remaining life for the various aircraft components of step 220. In addition, in certain embodiments, these recommendations (and/or the interpreted data of step 218 and/or the estimates of step 220) are then displayed for the user (step 223), preferably by the display 141 of the ground station 104 based on instructions provided thereto by the processor 142 of the ground station computer system 140. Finally, the performance-based maintenance may be implemented (step 224) when appropriate, for example by or through the ground station 104 and/or one or more users thereof.

The health monitoring process 200 thus preferably provides a fusion of all available information, including fusion of health maintenance data from a HUMS system with navigation data from a navigation system, as fused by one or more processors coupled to the HUMS system and the navigation system. The health monitoring process 200 thereby provides a multidimensional view of the aircraft data, in which a navigation and/or flight regime context is provided to the vibration data and/or vibration signature for the aircraft, and preferably also in combination with various other types of data pertaining to the aircraft. As a result, more accurate predictions can be made for estimation of life of aircraft components, and more cost effective condition-based maintenance can be recommended and employed with greater confidence.

Figure 3:
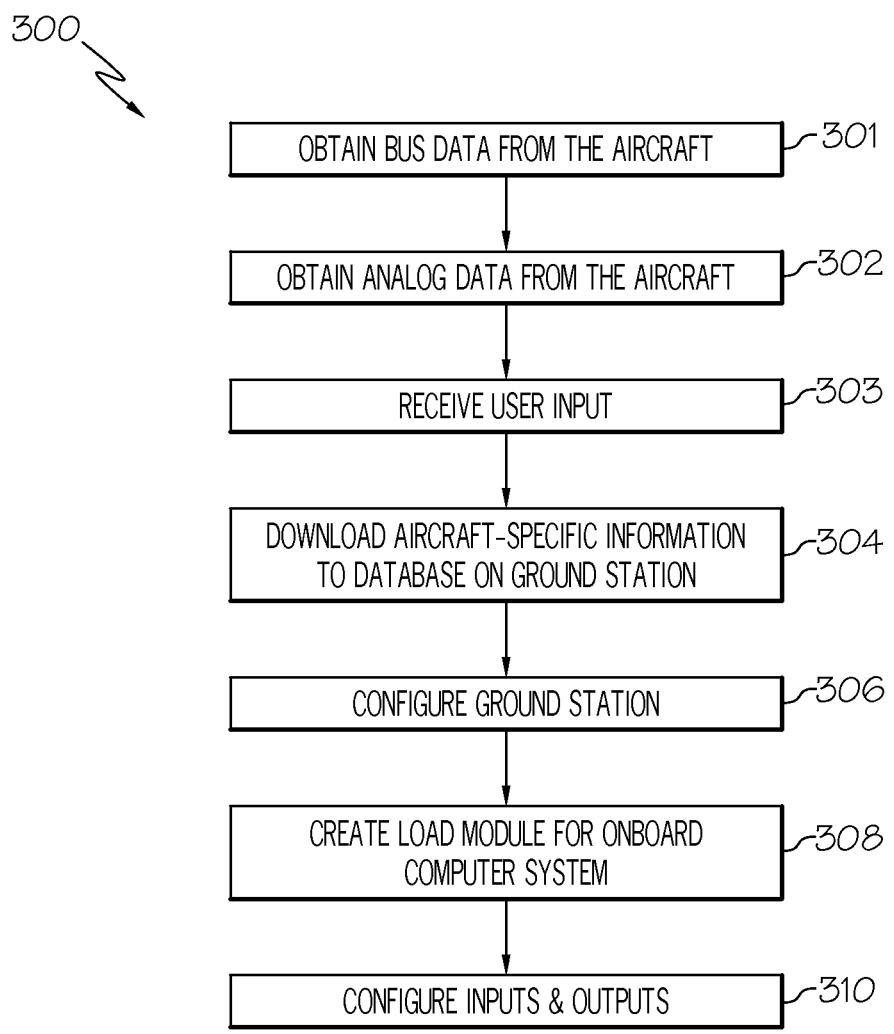
FIG. 3 is a flowchart of a process for initiating health monitoring for an aircraft, and that can be used in connection with the system of FIG. 1 and/or the process or FIG. 2, in accordance with an exemplary embodiment.

FIG. 3 is a flowchart of a health monitoring initiation process 300 for initiating health monitoring for an aircraft, in accordance with an exemplary embodiment. The health monitoring initiation process 300 can be utilized in conjunction with the system 100 of FIG. 1 and the health monitoring process of FIG. 2, also in accordance with an exemplary embodiment.

As depicted in FIG. 3, in an exemplary embodiment the health monitoring initiation process 300 begins with the step of obtaining bus data from the aircraft (step 301). In a preferred embodiment, the bus data includes aircraft attitude and performance information, tachometer data, and engine bus data, such as engine performance and control information, among various other types of bus data. Also in a preferred embodiment, the bus data is obtained by the ground station computer system 140 of FIG. 1 from the aircraft via the communications link 108.

In addition, analog data is obtained from the aircraft (step 302). In a preferred embodiment, the analog data includes environmental information, including without limitation temperature, pressure, humidity, and related information, as well as other types of analog data. Also in a preferred embodiment, the analog data is obtained by the ground station computer system 140 of FIG. 1 from the aircraft via the communications link 108.

In addition, user input is obtained by the set-up tool 106 of FIG. 1 (step 303). In a preferred embodiment, the user input pertains to information as to details of a make-up of the particular aircraft of FIG. 1. Also in one preferred embodiment, the user input includes geometric information pertaining to the aircraft, such as, by way of example only, a number of blades on the aircraft (for example for a helicopter), a number of gear boxes for the aircraft, a number of gears for each gearbox, a meshing of the different gears, a number of teeth for the different gears, and various other geometric information pertaining to the aircraft, among other types of information as to the make-up of the particular aircraft of FIG. 1.

The user input information (preferably including the aircraft-specific information, such as geometric information regarding the aircraft, for example, of the types noted above, among other aircraft-specific information) is then provided to a database (step 304). In a preferred embodiment, the user input information is provided to the database 153 of the ground system computer system 140 of FIG. 1. The ground station 104 of FIG. 1 is then configured by the set-up tool 106 of FIG. 1 using the user input information in the database to customize the ground station with respect to the particular aircraft at issue (step 306). During the configuration of the ground station 104, the aircraft-specific information (such as the geometric information, noted above) in the database 153 is preferably utilized to select various algorithms for the ground station program 152 and various parameters for these algorithms that are tailored to the particular aircraft at issue, to thereby facilitate faster, more reliable, and more efficient generation of condition indicators using the ground station program 152.

In addition, a load module is created for the onboard computer system 114 (step 308). In a preferred embodiment, the load module is created by the set-up tool 106 and the ground station 104 using the user input information (preferably the above-described geometric information pertaining to the particular aircraft at issue). During the creation of the load module, the aircraft-specific information (such as the geometric information, noted above) in the database 153 is preferably utilized to select various algorithms for the onboard program 132 and various parameters for these algorithms that are tailored to the particular aircraft at issue, to thereby facilitate faster, more reliable, and more efficient generation of condition indicators using the onboard program 132.

Moreover, the inputs and outputs of the onboard computer system 114 are also preferably configured by the set-up tool 106 of FIG. 1 and the ground station computer system 140 of FIG. 1, including the processor 142 thereof that preferably executes the set-up tool 106 software module of FIG. 1. During configuration of the inputs and outputs of the onboard computer system 114, the aircraft-specific information (such as the geometric information, noted above) in the database 153 is preferably utilized to further select various algorithms for the ground station program 152 and various parameters for these algorithms that are tailored to the particular aircraft at issue, to thereby facilitate faster, more reliable, and more efficient generation of condition indicators using the ground station program 152.

The load module can subsequently be used in the control system 102 onboard the aircraft, and can then assist in supplying the above-referenced vibration data, navigation, fused data, and/or preliminary processing thereof via the inputs and outputs to the ground station computer system 140 for further processing, as the onboard program 132 and the ground station 104 have already been configured during steps 306-310 for faster and more efficient processing of the information pertaining to the particular aircraft at issue.

Accordingly, the health monitoring initiation process 300 configures the ground station 104 (and/or the ground station program 152 and/or database 153 used in connection therewith) and the onboard computer system 114 (and/or the onboard program 132 used in connection therewith) for the particular aircraft at issue. In a preferred embodiment, these configurations are performed at least substantially simultaneously with one another. As a result of these configurations by the set-up tool 106, the ground station 104 (and the ground station program 152 thereof) works seamlessly with the onboard computer system 114 (and the onboard program 132 used in connection therewith. In addition, the hardware of the onboard computer system 114 and the ground station 104 need not be significantly modified for different aircraft. Rather, the set-up tool 106 allows the hardware of the onboard computer system 114 and the ground station 104 to be generic in nature, and to be easily configured by the set-up tool 106 for nearly any type of applicable aircraft. In addition, in various embodiments, the set-up tool 106 and the monitoring initiation process 300 can be used to similarly configure any number of other different types of vehicles, machines, and/or systems.

The disclosed methods and systems provide for improved and more efficient and cost-effective health monitoring for devices, such as aircraft. For example, as discussed above in connection with FIGS. 1 and 2, the disclosed methods and systems provide a fusion of health maintenance data from a HUMS system with navigation data from a navigation system (among other additional data, in certain embodiments), to thereby provide a multidimensional view of the aircraft data, in which a navigation and/or flight regime context is provided to the vibration data and/or vibration signature for the aircraft. As a result, more accurate predictions can be made for estimation of life of aircraft components, and more cost effective condition-based maintenance can be recommended and employed with greater confidence. In addition, as discussed above in connection with FIGS. 1 and 3, the disclosed methods and systems provide a generic set-up tool and related processes that allows the ground station (and the ground station program) to work seamlessly with the onboard computer system (and the onboard program), and allows the ground station to be generic in nature, and to be easily configured by the set-up tool for nearly any type of applicable aircraft.

It will be appreciated that the disclosed methods and systems may vary from those depicted in the Figures and described herein. It will similarly be appreciated that certain steps of the health monitoring process 200 and the health monitoring initiation process 300 depicted in FIGS. 2 and 3, respectively, may occur simultaneously or in a different order than that depicted in FIGS. 2 and 3 and/or described herein in connection therewith. It will similarly be appreciated that the disclosed methods and systems may be implemented and/or utilized in connection with any number of different types of airplanes, helicopters, spacecraft, and/or other different types of aircraft, vehicles, machines, and/or systems in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method for health monitoring for an aircraft, the method comprising the steps of:
   obtaining vibration data for the aircraft via a health monitoring system;
   obtaining navigation data for the aircraft via a navigation system;
   fusing the vibration data and the navigation data, thereby generating fused data; and
   determining a measure of health of the aircraft using the fused data via a processor.

2. The method of claim 1, wherein:
   the vibration data comprises information pertaining to vibrations of one or more aircraft components during flight of the aircraft, and the step of obtaining the vibration data comprises the step of measuring the vibration data using the health monitoring system of the aircraft during flight of the aircraft; and
   the navigation data comprises information pertaining to movement of the aircraft during flight, and the step of obtaining the navigation data comprises the step of measuring the navigation data using the navigation system of the aircraft during flight of the aircraft.

3. The method of claim 2, wherein:
   the step of obtaining the vibration data further comprises the step of supplying the vibration data to the processor; and
   the step of obtaining the navigation data further comprises the step of supplying the navigation data to the processor.

4. The method of claim 3, wherein the processor is disposed onboard the aircraft.

5. The method of claim 3, wherein the processor is disposed on a ground station in communication with the aircraft.

6. The method of step 1, further comprising the steps of:
   generating a vibration signature of the aircraft; and
   generating a plurality of flight regime characteristics of the aircraft;
   wherein the step of fusing the vibration data and the navigation data comprises the step of fusing the vibration signature and the flight regime characteristics of the aircraft, to thereby generate the fused data.

7. The method of claim 6, further comprising the step of:
   calculating a plurality of stresses and strains of a plurality of components of the aircraft; and
   interpreting the plurality of stresses using the fused data, to thereby generate interpreted data.

8. The method of claim 7, further comprising the step of:
   estimating a measure of useful life for use of the plurality of components of the aircraft using the interpreted data.

9. The method of claim 8, further comprising the step of:
performing condition based maintenance on the estimated measures of life.

10. The method of claim 1, further comprising the steps of:
obtaining aircraft-specific information as to a make-up of the aircraft; and
downloading the aircraft-specific information to a database, to thereby generate a customized database for the aircraft;
wherein the step of determining the measure of health of the aircraft comprises the step of determining the measure of health of the aircraft using the vibration data, the navigation data, and the customized database.

11. A system for health monitoring for an aircraft, the system comprising:
a health monitoring system configured to at least facilitate measuring vibration data for the aircraft during flight of the aircraft;
a navigation system configured to at least facilitate measuring navigation data for the aircraft during flight of the aircraft; and
a processor coupled to the health monitoring system and the navigation system, the processor configured to at least facilitate:
fusing the vibration data and the navigation data, thereby generating fused data; and
determining a measure of health of the aircraft using the fused data.

12. The system of claim 11, wherein:
the health monitoring system is further configured to at least facilitate generating a vibration signature of the aircraft using the vibration data;
the navigation system is further configured to at least facilitate generating a plurality of flight regime characteristics of the aircraft using the navigation data; and
the processor is further configured to at least facilitate fusing the vibration signature and the flight regime characteristics of the aircraft, to thereby generate the fused data.

13. The system of claim 12, wherein the processor is further configured to at least facilitate estimating a measure of useful life for use of the plurality of components of the aircraft using the fused data.

14. The system of claim 12, further comprising:
a database; and
a set-up tool configured to at least facilitate:
obtaining aircraft-specific information as to a make-up of the aircraft; and
downloading the aircraft-specific information to the database;
wherein, to thereby customize the database for the aircraft;
wherein the processor is coupled to the database and further configured to at least facilitate determining the measure of health of the aircraft using the vibration data, the navigation data, and the database as customized by the set-up tool.

15. The system of claim 12, wherein:
the health monitoring system comprises a plurality of accelerometers; and
the navigation system comprises:
a global positioning (GPS) receiver; and
a plurality of inertial navigation sensors.

16. The system of claim 12, further comprising:
a housing;
wherein the health monitoring system and the navigation system are disposed within the housing.

\* \* \* \* \*